H. O. STEVENS.
DIRIGIBLE HEADLIGHT.
APPLICATION FILED APR. 17, 1914.

1,116,151.

Patented Nov. 3, 1914.

Inventor
H. O. Stevens

UNITED STATES PATENT OFFICE.

HARRY O. STEVENS, OF CASCADE, WISCONSIN.

DIRIGIBLE HEADLIGHT.

1,116,151. Specification of Letters Patent. Patented Nov. 3, 1914.

Application filed April 17, 1914. Serial No. 832,588.

*To all whom it may concern:*

Be it known that I, HARRY O. STEVENS, a citizen of the United States, residing at Cascade, in the county of Sheboygan and State of Wisconsin, have invented certain new and useful Improvements in Dirigible Headlights, of which the following is a specification.

This invention has for its object to provide a mechanism attachable to motor vehicles and operably connected with the steering gear thereof for shifting the headlights simultaneously with the adjustment of the steering wheels.

Another object is the provision of means for disconnecting the headlight shifting mechanism from the steering gear and locking the headlights against movement.

Figure 1:
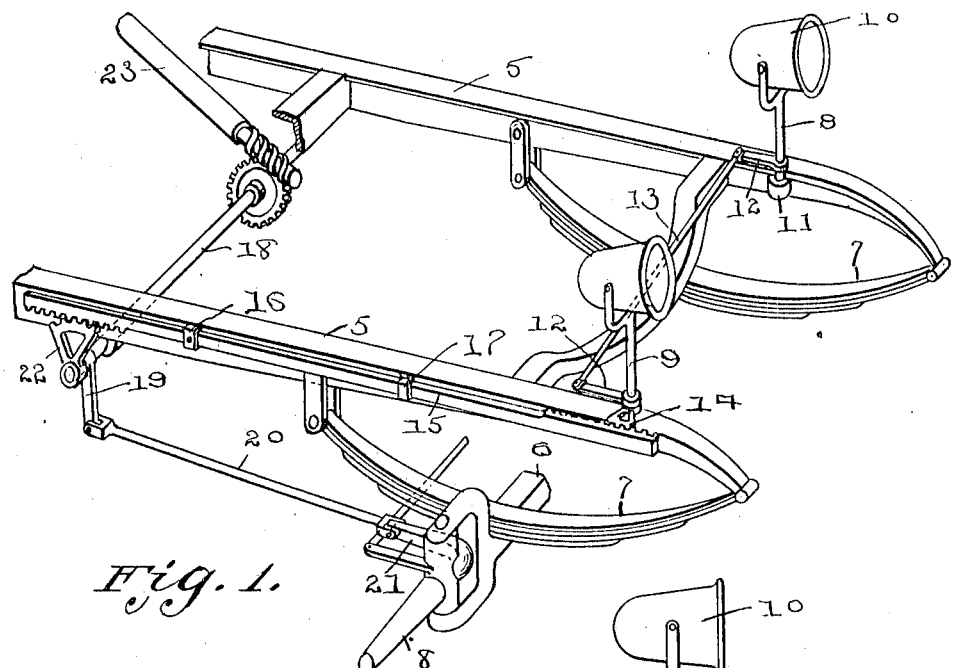
Figure 2:
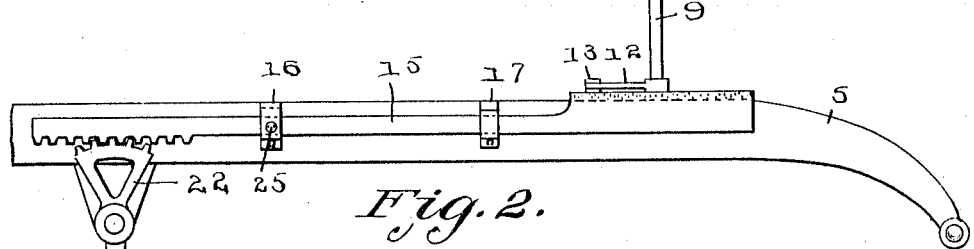
Figure 3:
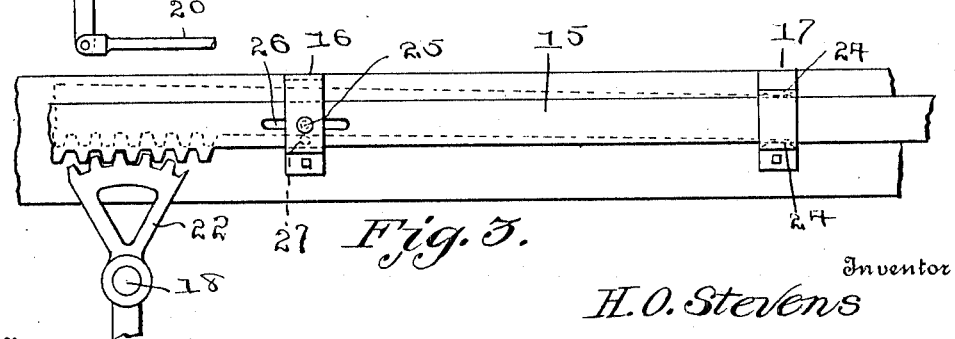

With these and other objects in view, the invention consists in the novel construction, arrangement and combination of parts as will be hereinafter specifically described, claimed and illustrated in the accompanying drawings, in which, Figure 1 represents a perspective view of the dirigible headlights attached to the chassis of a motor vehicle, Fig. 2 represents a side elevation thereof, and, Fig. 3 represents an enlarged fragmental view in side elevation of a part of the shifting mechanism, showing in detail the device for locking the headlights against movement.

Referring to the drawing in detail, wherein similar reference numerals designate corresponding parts throughout the several views, the numeral 5 indicates the side rails of the motor vehicle chassis supported above the front axle 6 by interposed springs 7. Stub shafts 8 are journaled for pivotal movement on a vertical axis in the bifurcated ends of the front axle 6 and are adapted to rotatably secure the front steering wheels of the vehicle.

Lamp brackets 9 are provided with upper forked ends providing a support for the lamps 10, and the lower ends of the brackets are pivotally mounted at 11 in the side rails 5 in any preferred manner. The shanks of the brackets 9 are formed with crank arms 12 connected by a rod 13 extending between the side rails 5. One of the brackets 9 is provided with a segmental rack 14 adapted to coöperate with the laterally projecting teeth formed on the slidable bar 15 supported in parallelism with the side rails 5 in hangers 16 and 17. The rear end of the slidable bar 15 terminates a short distance rearwardly of the intermediate shaft 18 of the steering gear which latter is provided with a depending crank arm 19 connected by a rod 20 with the arm 21 carried by the shaft member 8. The intermediate shaft 18 is provided with a rack segment 22 the teeth of which normally mesh with teeth formed on the under side of the rear end of the slidable bar 15.

In operation, the steering shaft 23 carrying at its upper end the steering wheel of the motor vehicle is actuated to steer the vehicle as desired. Simultaneously with the rotation of the intermediate shaft 18 of the steering gear the slidable bar 15 is moved longitudinally of the side rail 5 imparting motion to the headlights 10 through the rack segment 14, crank arms 12 and connecting rod 13.

The front hanger 17 is formed on its top and bottom walls with convex faces 24 adapted to permit the slidable rod 15 to be rocked sufficiently to move the teeth on the rear end thereof out of mesh with the teeth of the rack segment 22 and thus disconnect the slidable bar 15 from the shaft 18. The rear hanger 16 is provided with an aperture receiving pin 25 positioned within an opening 26 formed longitudinally in the bar 15. The opening 26 is of sufficient length to permit maximum longitudinal movement of the bar 15 and the latter is formed centrally and directly under the slot 26 with an opening 27 approximately the same diameter as the pin 25 and adapted to receive the latter to lock the rear end of the bar 15 in elevated position and out of mesh with the rack segment 22.

What I claim is :—

1. A device of the character described comprising a support, lamps pivotally secured to said support, and connection between said lamps, a rack segment secured to one of said lamps, a slidable bar having teeth at the forward end meshing with said rack segment, means for pivotally and slidably supporting the forward end of said bar, means for adjustably securing the rear end of said bar, teeth on the rear end of said bar, a shaft rotatably mounted in said support, and a rack segment secured on said shaft adapted to mesh with the teeth on the rear end of said bar.

2. In combination, a slidably and pivotally mounted bar, teeth on the opposite ends of said bar, a rack segment meshing with the teeth on one end of said bar, means for raising said end of the bar to disengage the teeth thereof from the teeth of said rack segment, lamps pivotally supported adjacent the opposite end of said bar, and operable connections between said lamps and said end of the bar.

In testimony whereof I affix my signature in presence of two witnesses.

H. O. STEVENS.

Witnesses:
　Wm. L. Long,
　E. F. Clark.

Copies of this patent may be obtained for five cents each, by addressing the "Commissioner of Patents, Washington, D. C."